July 24, 1962     C. H. BRUMLEY     3,046,554
RECORDING APPARATUS
Filed July 21, 1958
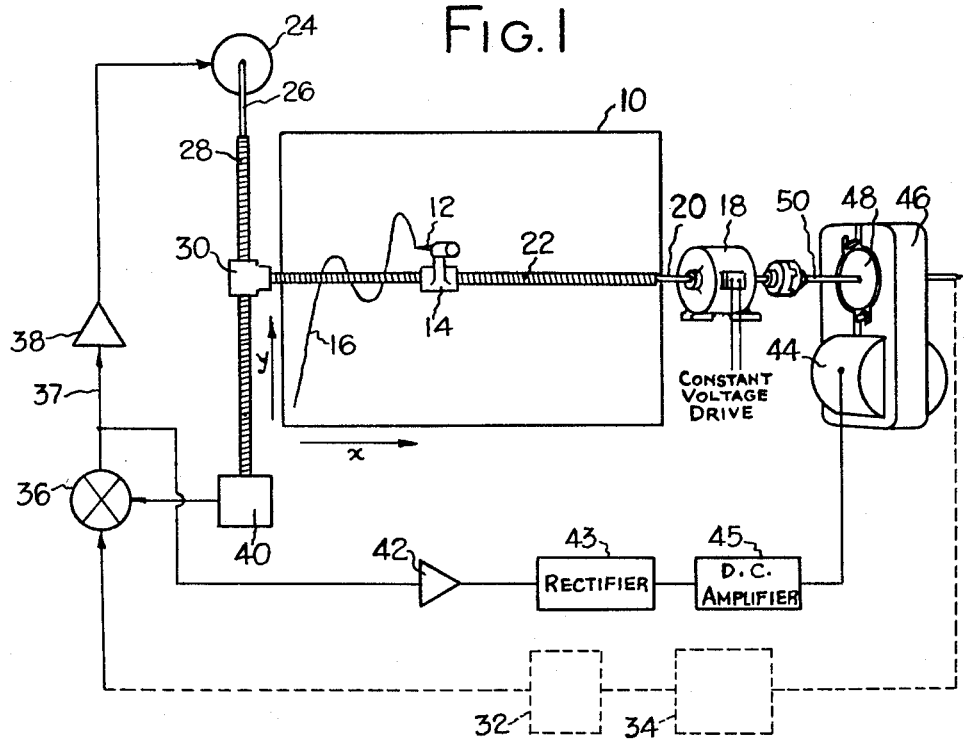
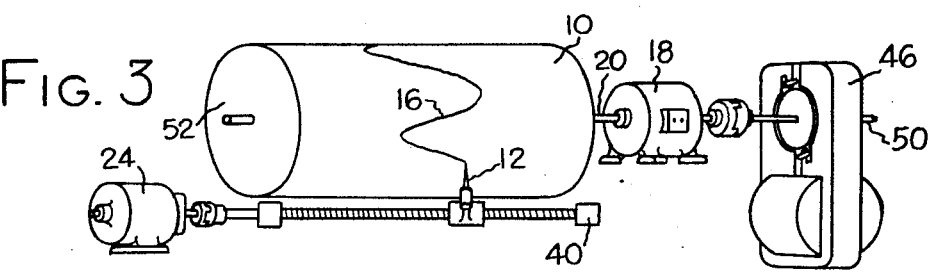
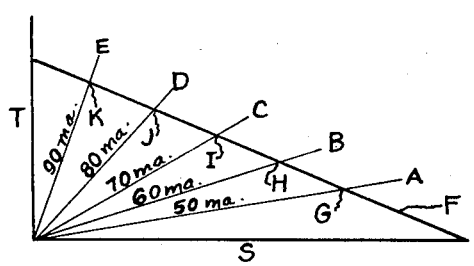
CORWIN H. BRUMLEY
INVENTOR.
BY *J. A. Ellestad*
    *B. G. Chiome*
ATTORNEYS United States Patent Office 3,046,554
Patented July 24, 1962

3,046,554
RECORDING APPARATUS
Corwin H. Brumley, Penfield, N.Y., assignor to Bausch & Lomb Incorporated, a corporation of New York
Filed July 21, 1958, Ser. No. 749,971
14 Claims. (Cl. 346—29)

This invention relates to recording apparatus, and, more particularly, to recording devices which will record a graph of a dependent variable as a function of an independent variable.

In recording apparatus of the orthogonal or "x-y" type, the independent variable is changed uniformly with time and a galvanometer or servo driven stylus moves to record the dependent variable. In some of these records, the independent variable, hereafter called "x" is moved at a continuous rate with a sacrifice in the accuracy of the dependent variable, hereafter referred to as "y," in the event that the changes in "y" are relatively great, such as when the graph will have sharp peaks. In order to accomplish any accuracy at all, some of these machines must be slowed down, that is, the rate of change of the independent variable is made smaller so that no conceivable variation in the dependent variable could be so abrupt that the stylus would fail to follow it properly. This means that the time consumed in recording a function is not normally determined by the overall complexity of this function (as it would be in manual plotting of points) but by the steepest instantaneous slope to be expected.

It is the object of the present invention to provide a recording apparatus with means for automatically and continuously adjusting the rate of change of an independent variable so that the position of the recorder stylus will always correspond to the instantaneous value of a dependent variable.

Other objects and advantages will become apparent from the following description taken in conjunction with the accompanying drawing, wherein:

FIG. 1 is a diagrammatic illustration of a recording apparatus embodying the principles of the present invention;

FIG. 2 is a graph illustrating the effect of the principles of the present invention upon the drum motor utilized in the recorder shown in FIG. 2; and FIG. 3 is a partial diagrammatic illustration of the present invention as applied to a particular type of recorder.

Referring now to FIG. 1, wherein there is shown a diagrammatic representation of a recording apparatus including a recording chart 10 upon which it is desired to record a phenomenon having a dependent variable as a function of an independent variable. For purposes of illustration, the independent variable will be designated "x" and in FIG. 1, this will be varied in the direction indicated by the horizontal arrow. For the same purposes, the dependent variable will be designated "y" and will vary in the direction of the vertical arrow so indicated. The present invention is concerned with causing the recording of a phenomenon to proceed rapidly where the graph is simple, i.e., where "y" changes slowly as a function of "x" and to proceed slowly where the graph is complex, i.e., where "y" changes rapidly as a function of "x."

Since the present invention can be incorporated into present day recording apparatus, details of the operating components for the recording apparatus will not be presented. These components are well known in the art and will be touched upon only briefly. A stylus 12 mounted on a carriage 14 is adapted to cooperate with the chart 10 for recording a graph 16 of a phenomenon or condition. Movement of the stylus in the "x" direction is effected by a suitable drive motor 18 which has its shaft 20 connected to a screw 22 for imparting rotation thereto. The carriage 14 is in threaded engagement with the screw 22 which has its longitudinal axis lying in the direction "x". The motor 18 is preferably of the servo type wherein the shaft may be stalled without damage to the motor and is electrically energized from a constant voltage source. It will be apparent that upon rotation of the shaft 20, the screw 22 will likewise be rotated in order to effect movement of the carriage 14 therealong.

Movement of the stylus in the "y" direction is effected by a drive motor 24 which has its shaft 26 connected to a screw 28 which has its axis lying in the "y" direction. For purposes of simplicity of description, the screw 28 may be regarded as in fixed position with respect to the chart 10. A carriage 30 is mounted on the screw 28 for travel therealong in response to rotation thereof. To provide for coordinated movement of the stylus 12, the end of the screw 22 is rotatably received and retained in the carriage 30. Rotation of the screw 28 will impart movement to the carriage 30 and consequently movement to the screw 22 and the motor 18. Suitable structure (not shown) may be provided for permitting movement of the screw 22 and the motor 18 across the chart 10 in the "y" direction upon rotation of the screw 28.

The dependent variable "y" may be any condition or phenomenon that is a function of the independent variable "x" and, as such, may take various forms, for example, mechanical movements, electrical impedances, currents or voltages, pneumatic pressures, and optical characteristics such as transmittance, reflectance. As is well known in the recording art, the form of the condition to be recorded is generally converted to an electrical signal either directly, or, in the case that the condition is a comparison of a standard and a sample specimen, the signal is a measure of deviation from the standard, commonly called an error signal. On the other hand, the "x" variable may be any quantity indicative of a physical condition imposed upon a system of which "y" is the output and is variable in accordance with changes in "x." Generally in recording, the value of "x" is varied at a constant or equal rate such as for example where it is desired to graph the resistance or temperature of an electrical element at various voltages, the element would be induced with equal units of voltage the number of which is successively increased. In spectrophotometry, if it is desired to plot or graph percentage of transmittance as a function of wave length, the wave length which would be the independent variable "x" is varied in equal units of length. In this type of measurement, light of a particular wave length is imposed upon a system which will vary in accordance with this wave length to produce a certain percent of transmittance.

In FIG. 1, a typical system, the output of which is to be recorded, as indicated at 32. A transducer indicated at 34 is coupled to the system 32 and serves to induce in the same corresponding changes in the independent variable "x" for producing the output. The structure of the system 32 and the transducer 34 may be of any suitable form depending upon the phenomena to be recorded. In the event it is desired to record temperature rise as a function of current in a circuit or a particular conductor, the system 32 would be the circuit or the conductor and the transducer would be a variable transformer or current varying device which could be automatically or manually adjusted to vary the current. Similarly, if the percent of transmittance of a sample fluid specimen is to be measured as a function of a particular span of the spectrum, the system 32 would then take the form of a signal generator which is adapted to generate a signal in accordance with a comparison between the transmission of light through the sample specimen and a reference or standard fluid specimen, and the transducer 34 would take the form of a monochromator for varying the wave length of the light passing through the sample and standard specimens. It will be quite obvious to those skilled in the art that other forms of systems and transducers may be incorporated into the recording apparatus of FIG. 1, depending upon the condition to be recorded.

The system 32 is coupled to a difference comparison circuit 36 which is adapted to receive the electrical signal from the system 32. An amplifier 38 is connected by a conductor 37 to the circuit 36 for amplifying this signal and impressing the same upon the drive motor 24. A suitable position indicator 40, which may be in the form of a potentiometer, is associated with the drive screw 28 and is adapted to produce a signal indicative of the relative positioning of the stylus in the "y" direction. This signal is fed to the difference circuit in 36 in opposition to the signal received therein from the system 32. The elements 36, 38, 24 and 40 comprise a servo system of which there are many in the market for the recording field. In these systems, a signal for energizing the motor 24 is balanced out when the stylus 12 has reached a position corresponding to the value of the signal. This balancing occurs in the difference circuit 36 and in the event that a change in the signal from the system 32 occurs, and for purposes of illustration, assuming that it is an increase in the value of the signal, the difference between the increased signal and a previous signal which has already energized the motor 24, energizes the motor for moving the stylus to a new position of indication which movement will adjust the indicator 40 to produce a new signal in accordance with the increased signal thereby balancing out the same. During recording of the curve 16 on the chart 10, the movement of the stylus 12 along the "y" direction is effected by the difference in the signal which energizes the motor 24 and the signal produced by the indicator 40 before balancing occurs. From this it will be obvious that this difference in the signals will be proportional to the distance the stylus moves. In other words, the force moving the stylus is proportional to the difference between the correct position of the stylus and the actual position of the same or the difference signal. This condition is utilized to control the speed of the motor 18 as will presently be described. The indicator 40 may assume forms other than a potentiometer, such as a variable inductance or a variable capacitance the impedance of which will change in accordance with the position of the stylus for generating a signal for the circuit 36.

The difference signal which is fed to the servo amplifier 38 is in A.C. form and is also fed to an amplifier 42 where amplification of the difference signal occurs. The amplified A.C. output signal after being rectified in a rectifier 43 and amplified in a D.C. amplifier 45 is conducted to the energizing coil 44 of an A.C. induction motor 46 having an armature 48 and a shaft 50 coupled to the shaft 20 of the motor 18. The flux produced by the direct current flow in the coil 44 cuts across the winding of the armature 48 thereby introducing viscous damping against rotation of the shaft 50 in either direction by any external force, such, as in this case, the force produced by rotation of the shaft 20. Upon energization with a D.C. signal, the motor 46 then serves as a retarding force or brake to the rotation of the shaft 20 and consequently the movement of the stylus 12 in the "x" direction. The amount of this force is proportional to the value of the D.C. signal energizing the coil 44 of the motor 46 and the value of this signal, in turn, is proportional to the difference or error signal reaching the motor 24.

The shaft 50 is suitably coupled to the transducer 34 so that the generation of the initiating signal in the system 32 will be responsive to the rotational speed of the screw 22. As previously stated, the transducer 34 may be driven manually, however, by being coupled to the shaft 50, the actuation of the transducer becomes automatic. Referring to the example outlined above in regard to the system 32 and the transducer 34, wherein the latter may be a variable transformer for controlling the energization of the former which may be a conductor or resistor, the temperature of which is to be measured for increases of voltage or current, the coupling between the shaft 50 and the transducer 34 will enable these increases of voltage to be introduced automatically. In the event that the recording apparatus is to be utilized for a spectrophotometer for recording the absorption spectra, the transducer would be a monochromator wherein the rotation of the shaft 50 would rotate a dispersion element in the monochromator in order to scan the spectrum. In each of these examples, the movement of the stylus in the "x" direction would be in accordance with the voltage or current values or the values of wave length of the portion of the spectrum utilized, as the case may be. As the transmittance or temperature or any other condition to be recorded begins to change rapidly, the braking effect of the motor 46 applied to the servo motor 18 slows the movement of the stylus in the "x" direction and thus allows the stylus additional time to record the portions of relatively greater slope in the curve.

In operation, the motor 18 is energized from a source of constant voltage simultaneously with the energization of the motor 46 by a signal from the system 32, which signal will be indicative of the condition to be measured. Generally, for relatively small rates of change in the value of the variable "y," the speed of the motor 18 will be approximately constant and the stylus 12 will be driven in the "x" direction at a constant speed. While not shown, suitable reduction gearing may be utilized in order to permit scanning in the "x" direction at a relatively slow rate, such as the length of the chart 10 in one minute. If the values of "y" are constant, the value of the signal reaching the motor 24 is constant and the position indicator 40 will generate a signal for the difference circuit to continually balance out this energizing signal. Under these conditions, no signal reaches the amplifier 42 and the motor 46 will be deenergized thus permitting the motor 18 to drive the stylus 12 in the "x" direction at its maximum speed.

In the event there is a change in the value of "y," the energizing signal in accordance thereof, will be introduced in the conductor 37 before it is balanced by the position indicator 40. Such being the case, the energizing signal will be introduced to the amplifier 42, rectifier 43, D.C. amplifier 45, and the energizing coil 44 of the motor 46. The rotational speed of the shaft 20 will thus be impeded and the movement of the stylus in the "x" direction will be slowed in order to permit accurate movement of the stylus in the "y" direction. The value of the signal reaching the amplifier 42 is not determined by the value of the signal emitted from the system 32, but rather on the difference between this new instantaneous signal and the balancing signal from the indicator 40 for the previous value of "y." Consequently, the value of the signal reaching the amplifier 42 is proportional to the difference between the value of the energizing signal in the conductor 37 and the balancing signal from the indicator 40. From this it will be apparent that if there is a lag present in the indicator 40, the amount of the signal reaching the amplifier 42 is greatest when the changes in the values of "y" are sudden. Progressing still further, the amount of the retarding force applied to the shaft 20 by the motor 46 is proportional to the value of the signal reaching the coil 44. As the sudden changes in the value of "y" become greater, the speed of the stylus in the "x" direction becomes slower. For small sudden changes in "y," the changes in rotational speed of the shaft 20 will be small. Putting it another way, it may be said that the speed of the movement of the stylus in the "x" direction is inversely proportional to the rate of change of "y" or to the slope of the curve 16 at the portion thereof being traced at any given moment.

In FIG. 2, a series of torque-speed curves A, B, C,

D, E for the motor 46 are superimposed upon the torque-speed curve F of the servo motor 18 in order to illustrate the effect of the speed of the drive motor 18 upon energization of the motor 46. As is common with servo motors, the torque of the motor 18 is greatest when the speed thereof is zero and, conversely, the torque is zero when the motor is at full speed. On the other hand, the induction motor has reverse characteristics when loaded with direct current as in the instant case, namely, retarding torque is proportional to speed and to the energization current. For illustration purposes, the curves A—E have been given particular values to show the operating point for the drive screw 22. If an energizing current of 50 ma. is applied to the coil 44, the operational speed of the shaft 20 for the point G is somewhat reduced. For a current of 60 ma., the operating point H indicates a still further reduced speed. Similarly, the operating points I, J and K indicate further reduction in the speed of the screw 22 upon application of currents having values 70 ma., 80 ma. and 90 ma., respectively.

The present invention as illustrated in FIG. 1, has broad applications for many measuring purposes and may take various forms. In FIG. 1, the principles of the invention have been illustrated in conjunction with a general rectilinear type of recorder. Another form of recording apparatus that the present invention may be applied to is the common drum recorder, as shown in FIG. 3. In this application, the servo motor 18 is arranged to rotate the drum 52 upon which the chart 10 is placed. The "y" drive motor 24 is arranged to move the stylus 12 parallel to the axis of the drum and the motor 46 is coupled to the shaft 20 of the motor 18 in order to retard the speed thereof. The operation of the recorder of FIG. 3 is identical with the recorder of FIG. 1. The rotational speed of the drum 52 will be proportional to the slope of the curve 16 for sudden changes in the values of "y." Maximum rotational speed will be attained when there is no change in the values of "y," which maximum speed for the recorders of FIGS. 1 and 3 will be had when there is a straight line curve of constant "y" value.

From the foregoing description it will be appreciated that the present invention may be applied to various recording apparatus which are designed to record a graph of one or more variables as a function of one or more independent variables. As applied to a recording apparatus, recording is facilitated in that there is automatic and continuous adjustment of the independent variable so that positioning of the stylus will correspond to the instantaneous value of a dependent variable. In recording a phenomenon, sudden or sharp rises in the curve or graph will cause correspondingly slower changes in the rate at which the curve is plotted. In the event the graph is simple i.e., where "y" changes slowly as a function of "x," recording is relatively fast and in the event that the graph is complex, i.e., where "y" changes rapidly as a function of "x," recording is relatively slow.

I claim:

1. In a recording apparatus having a stylus movable across a chart for recording a dependent variable as a function of an independent variable, the combination comprising a first drive means for producing relative motion at constant speed between the stylus and the chart along one axis of the chart in accordance with variations in the independent variable, a second drive means for producing relative motion between the stylus and the chart along another axis in accordance with variations in the dependent variable, a circuit for producing a signal indicative of the difference between the actual position of the stylus along said another axis and the position to be occupied at instantaneous changes in the value of the dependent variable, and means operatively associated with said second drive means for producing a retarding force in accordance with said signal, said last-named means being arranged so that said retarding force is applied in opposition to the driving force of said first drive means whereby the speed of the relative movement between the stylus and the chart along said one axis is varied inversely by said signal.

2. In a recording apparatus having a stylus movable across a chart for recording a dependent variable as a function of an independent variable, the combination comprising a first motor means and shaft for producing relative motion at constant speed between the stylus and the chart along one axis of the chart in accordance with variations in the independent variable, a second motor means for producing relative motion between the stylus and the chart along another axis thereof in accordance with variations in the dependent variable, and means including a second shaft and a braking motor for imparting a retarding force upon said second shaft against rotation thereof in accordance with instantaneous changes in the value of the dependent variable, said shaft of said braking motor being coupled to the shaft of said first motor means so that said retarding force is applied in opposition to the driving rotational force of said shaft of said first motor means whereby the speed of the relative movement between the stylus and the chart along said one axis of the chart is varied inversely to the amount of an instantaneous change in value of the dependent variable.

3. In a recording apparatus having a stylus movable across a chart for recording a dependent variable as a function of an independent variable, the combination comprising a first motor means and shaft for producing relative motion at constant speed between the stylus and the chart along one axis of the chart in accordance with variations in the independent variable, a second motor means for producing relative motion between the stylus and the chart along another axis thereof in accordance with variations in the dependent variable, a circuit for producing a signal indicative of the difference between the actual position of the stylus along said another axis of the chart and the position to be occupied at instantaneous changes in the value of the dependent variable, and means including a second shaft and a braking motor for imparting retarding force upon said second shaft against rotation thereof in accordance with said signal, said shaft of said braking motor being coupled to the shaft of said first motor means so that said retarding force is applied in opposition to the driving rotational force of said shaft of said first motor means whereby the speed of the relative movement between the stylus and tthe chart along said one axis of the chart is varied inversely by said signal.

4. In a recording apparatus of the type having a drum upon which a recording chart is positioned, a stylus for recording a dependent variable as a function of an indepedent variable, a motor driven shaft for rotating the drum at a constant speed and a motor device for moving the stylus across the chart parallel to the axis of the drum in accordance with variations in the dependent variable, the combination comprising means including a shaft and a braking motor for imparting a retarding force upon said last-named shaft against rotation thereof in accordance with instantaneous changes in the value of the dependent variable, said shaft of said braking motor being coupled to the motor driven shaft for the drum so that said retarding force is applied in opposition to the driving rotational force of the drum shaft whereby the rotational speed of the drum is varied inversely to the amount of an instantaneous change in value of the dependent variable.

5. In a recording apparatus of the type having a drum upon which a recording chart is positioned, a stylus for recording a dependent variable as a function of an independent variable, a motor driven shaft for rotating the drum at a constant speed and a motor device for moving the stylus across the chart parallel to the axis of the drum in accordance with variations in the dependent variable, the combination comprising a circuit for producing a signal indicative of the difference between the actual position of the stylus and the position to be occupied at instantaneous changes in the value of the dependent variable, and means including a shaft and a braking motor for imparting a retarding force upon said last-named shaft against rotation thereof in accordance with said signal, said shaft of said braking motor being coupled to the motor driven shaft for the drum so that said retarding force is applied in opposition to the driving rotational force of the drum shaft whereby the rotational speed of the drum is varied inversely to said signal.

6. In a recording apparatus of the type having a drum upon which a recording chart is positioned, a stylus for recording the curve representing a dependent variable as a function of an independent variable, a motor driven shaft for rotating the drum at a constant speed and a motor device for moving the stylus across the chart parallel to the axis of the drum in accordance with variations in the dependent variable, the combination comprising means including a shaft and a braking motor for imparting a retarding force upon said last-named shaft against rotation thereof in accordance with changes in the slope of the curve at successive points thereon, said shaft of said braking motor being coupled to the motor driven shaft for the drum so that said retarding force is applied in opposition to the driving rotational force of the drum shaft whereby the rotational speed of the drum is varied inversely to said changes in the slope of the curve.

7. In a recording apparatus of the type having a drum upon which a recording chart is positioned, a stylus for recording a dependent variable as a function of an independent variable, a motor driven shaft for rotating the drum at a constant speed and a motor device for moving the stylus across the chart parallel to the axis of the drum in accordance with variations in the dependent variable, the combination comprising a circuit for detecting variations in values of the dependent variable for producing a signal in accordance with the amount of said variations, and means including a shaft and a braking motor energized by said signal for imparting a retarding force upon said last-named shaft against rotation thereof in accordance with the amount of said variations, said shaft of said braking motor being coupled to the motor driven shaft for the drum so that said retarding force is applied in opposition to the driving rotational force of the drum shaft whereby the rotational speed of the drum is varied inversely to the amount of said variations.

8. In a recorder of the type having a recording surface, a stylus, means including an electric motor for producing relative movement between the stylus and the surface in a first coordinate direction synchronously with variations of a controllable first signal, and means for producing relative movement between the stylus and the surface in a second coordinate direction in response to a second signal, the improvement comprising means for controlling the first signal in response to the output drive of the electric motor, means for energizing the motor at a relatively constant rate, and variable braking means for mechanically braking the motor thereby to vary its speed, said braking means being responsive to the rate of change of said second signal.

9. In a recorder of the type having means for mounting a recording surface for movement along one coordinate direction, a stylus mounted for movement across the surface in another coordinate direction, and means for driving the stylus responsively to an input signal, the improvement comprising drive means for synchronously (a) driving the recording surface and (b) controlling an independent variable to which the stylus input signal is responsive, and means for controlling said drive means in response to changes in the rate of change of the input signal.

10. In a recorder of the type having means for mounting a recording surface for movement along one coordinate direction, a stylus mounted for movement across the surface in another coordinate direction, and means for driving the stylus responsively to an input signal, the improvement comprising drive means for synchronously (a) driving the recording surface and (b) controlling an independent variable to which the input signal is responsive, and means for controlling said drive means in inverse response to changes in the rate of change of the input signal.

11. In a recorder of the type having means for mounting a recording surface for movement along one coordinate direction, a stylus mounted for movement across the surface in another coordinate direction, and means for driving the stylus responsively to an input signal, the improvement comprising a motor having a common output for synchronously driving the recording surface and controlling an independent variable to which the input signal is responsive, and means for varying the speed of said motor in inverse response to changes in the rate of change of the input signal.

12. In a recorder of the type having means for mounting a recording surface for movement along one coordinate direction, a stylus mounted for movement across the surface in another coordinate direction, and means for driving the stylus responsively to an input signal, the improvement comprising a motor having a common output for synchronously driving the recording surface and controlling an independent variable to which the input signal is responsive, and means for varying the speed of said motor in inverse response to changes in the rate of change of the input signal, said motor being energized at a uniform rate, and said speed varying means including a brake for braking said motor.

13. A recording spectrophotometer of the type including a variable monochromator having a wave length drive, a recorder having a rotatable drum for mounting a chart, and a stylus mounted for movement across the drum along a path parallel to the axis of rotation thereof, means for producing a signal responsively to movement of the wave length drive, and means for moving the stylus in response to a signal so produced, said spectrophotometer comprising a common drive motor for synchronously driving the drum and the wave length drive, and means for varying the speed of said motor in response to changes in the rate of change of the signal produced responsively to movement of the wave length drive.

14. A recording spectrophotometer of the type including a variable monochromator having a wave length drive, a recorder having a rotatable drum for mounting a chart, and a stylus mounted for movement across the drum along a path parallel to the axis of rotation thereof, means for producing a signal responsively to movement of the wave length drive, and means for moving the stylus in response to a signal so produced, said spectrophotometer comprising a common drive motor for synchronously driving the drum and the wave length drive, means for energizing said motor at a constant rate, and means for varying the speed of said motor in response to changes in the rate of change of the signal produced responsively to movement of the wave length drive, said speed varying means including a brake for braking said motor.

References Cited in the file of this patent

UNITED STATES PATENTS

| | | |
|---|---|---|
| 1,598,595 | Angus | Sept. 7, 1926 |
| 1,755,079 | Schiebeler | Apr. 15, 1930 |
| 2,281,954 | Rinia | May 5, 1942 |
| 2,334,510 | Roberts | Nov. 16, 1943 |
| 2,415,879 | Hassler | Feb. 18, 1947 |
| 2,467,808 | Canada | Apr. 19, 1949 |
| 2,605,671 | Canada | Aug. 5, 1952 |
| 2,805,373 | Bonnell | Sept. 3, 1957 |
| 2,846,638 | Suel | Aug. 5, 1958 |
| 2,846,641 | Basham | Aug. 5, 1958 |
| 2,943,905 | Godet | July 5, 1960 |